United States Patent
Pidcoe et al.

(10) Patent No.: US 8,942,874 B2
(45) Date of Patent: Jan. 27, 2015

(54) SELF INITIATED PRONE PROGRESSIVE CRAWLER

(75) Inventors: Peter E. Pidcoe, Mechanicsville, VA (US); Hlapang A. Kolobe, Edmond, OK (US)

(73) Assignees: Virginia Commonwealth University, Richmond, VA (US); The Board of Regents of the University of Oklahoma, Norman, OK (US)

( * ) Notice: Subject to any disclaimer, the term of this patent is extended or adjusted under 35 U.S.C. 154(b) by 132 days.

(21) Appl. No.: 13/698,371

(22) PCT Filed: May 20, 2011

(86) PCT No.: PCT/US2011/037276
§ 371 (c)(1),
(2), (4) Date: Jan. 31, 2013

(87) PCT Pub. No.: WO2011/146795
PCT Pub. Date: Nov. 24, 2011

(65) Prior Publication Data
US 2013/0144475 A1 Jun. 6, 2013

Related U.S. Application Data (60) Provisional application No. 61/346,527, filed on May 20, 2010.

(51) Int. Cl.
*B60L 9/00* (2006.01)
*B60L 15/04* (2006.01)
(Continued)

(52) U.S. Cl.
CPC ............ *B60L 15/04* (2013.01); *A47D 13/04* (2013.01); *A47D 13/08* (2013.01); *G05D 1/00* (2013.01);
(Continued)

(58) Field of Classification Search
CPC .......... A61G 5/02; A61G 5/021; A61G 5/024
USPC ............... 280/250.1; 601/5; 623/24
See application file for complete search history.

(56) References Cited

U.S. PATENT DOCUMENTS 3,992,023 A 11/1976 Moorer
4,569,532 A 2/1986 Mirkarimi
(Continued)

FOREIGN PATENT DOCUMENTS

MX 2008015471 A 9/2010

OTHER PUBLICATIONS

Vardhman Sheth, Accelerometer Controlled Robot, Mar. 16, 2012, sites.google.com.*

*Primary Examiner* — John Q Nguyen
*Assistant Examiner* — Aaron Smith
(74) *Attorney, Agent, or Firm* — Whitham Curtis Christofferson & Cook, PC (57) ABSTRACT

A self initiated prone progressive crawler facilitates crawling in infants by sensing the infant's intent and assisting movement. The device is designed as a mobility aid to assist an infant in prone locomotion. The infant can be placed in a prone position on a platform and secured with hook and loop straps. The arms and legs are unconstrained and are able to reach the floor comfortably. The self initiated prone progressive crawler is a motorized wheeled platform which has three points of contact with the ground. One point is an industrial trackball, mounted upside down to provide positional and positional derivative data to a controller. It is located roughly under the chest of the infant and is highly sensitive to movement. The other points of contact are two DC torque motors which are controlled by the controller. In addition to the positional and positional derivative data provided to the controller, the controller also receives data from four equally spaced load cells on a force plate and tn-axial accelerometer gyros attached to the upper and lower extremities of the child. The load cells provide force information between the infant and the device to allow weight shifts to be assessed and used as a control parameter. The accelerometer gyros generate data that provides patterns that can be correlated with crawling movements.

21 Claims, 13 Drawing Sheets

(51) Int. Cl.
   *A47D 13/04*   (2006.01)
   *A47D 13/08*   (2006.01)
   *G05D 1/00*   (2006.01)

(52) U.S. Cl.
   CPC ....... *A61G 2200/14* (2013.01); *A61G 2200/325* (2013.01); *A61G 2203/32* (2013.01); *A61G 2203/42* (2013.01)
   USPC ........... 701/22; 601/5; 280/250.1; 280/149.2; 623/24

(56) References Cited

U.S. PATENT DOCUMENTS

| | | | |
|---|---|---|---|
| 4,629,950 A * | 12/1986 | Ching | 318/285 |
| 5,299,454 A * | 4/1994 | Fuglewicz et al. | 73/172 |
| 5,324,064 A | 6/1994 | Sumser | |
| 5,368,532 A * | 11/1994 | Farnet | 482/5 |
| 5,639,105 A * | 6/1997 | Summo | 280/250.1 |
| 6,019,705 A | 2/2000 | Thom | |
| 6,244,991 B1 | 6/2001 | Bingham | |
| 6,983,813 B1 * | 1/2006 | Wright | 180/11 |
| 7,157,875 B2 * | 1/2007 | Kamen et al. | 318/434 |
| 7,182,351 B2 | 2/2007 | Williams | |
| 7,183,910 B2 * | 2/2007 | Alvarez et al. | 340/539.13 |
| 7,544,172 B2 * | 6/2009 | Santos-Munne et al. | 601/5 |
| 8,419,804 B2 * | 4/2013 | Herr et al. | 623/24 |
| 2005/0278857 A1 | 12/2005 | Fairchild | |
| 2011/0009245 A1 | 1/2011 | Flowers | |

* cited by examiner

SELF INITIATED PRONE PROGRESSIVE CRAWLER

CROSS-REFERENCE TO RELATED APPLICATIONS

This application is a Rule 371 application of international application PCT/US2011/37276 filed May 20, 2011, which claims the benefit of U.S. Provisional Application 61/346,527 filed May 20, 2010.

BACKGROUND OF THE INVENTION

1. Field of the Invention

The present invention generally relates to a device which facilitates crawling in infants who are unable to perform the act of locomotion and, more particularly, to a motorized wheeled platform that senses the infant's intent and provides gentle encouragement to assist movement.

2. Background Description

Infants with disabilities, such as cerebral palsy, Down's syndrome, and spina-bifida, have difficulty with early locomotion. Currently, therapists guide the child manually based on their clinical judgment of intention.

SUMMARY OF THE INVENTION

It is therefore an object of the present invention to provide a device which facilitates crawling in infants by sensing the infant's intent and assisting movement.

According to the invention, a self initiated prone progressive crawler is designed as a mobility aid to assist an infant in prone locomotion. The infant can be placed in a prone position and secured with loop straps. The arms and legs are unconstrained and are able to reach the floor comfortably. The self initiated prone progressive crawler is a motorized wheeled platform designed to fit a 4 to 24 month old infant (weight range from 15 to 35 lbs). An embodiment of the device has three points of contact with the ground. One point is an industrial trackball, mounted upside down to provide positional and positional derivative data to a controller. It may be located roughly under the chest of the infant and can be highly sensitive to movement. The other points of contact are two DC torque motors which are controlled by the controller. In addition to the positional and positional derivative data provided to the controller, the controller may also receive data from four equally spaced load cells on a force plate and tn-axial accelerometer gyros attached to the upper and lower extremities of the child. The load cells provide force information between the infant and the device to allow weight shifts to be assessed and used as a control parameter. The accelerometer gyros generate data that provides patterns that can correlated to crawling. These patterns can be used to develop control algorithms for the device.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

Figure 1A:
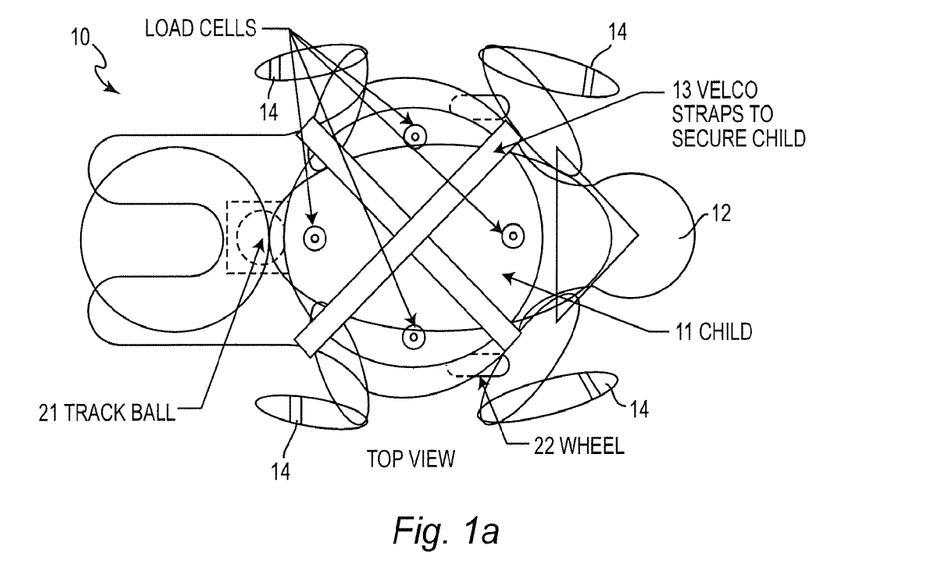
FIGS. 1a-b are top and side pictorial diagrams illustrating an infant attached to the self initiated prone progressive crawler according to the invention.
Figure 1B:
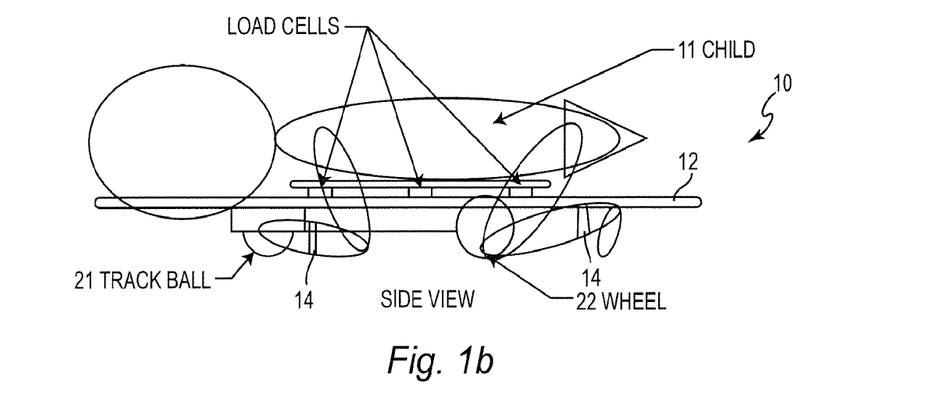
Figure 2A:
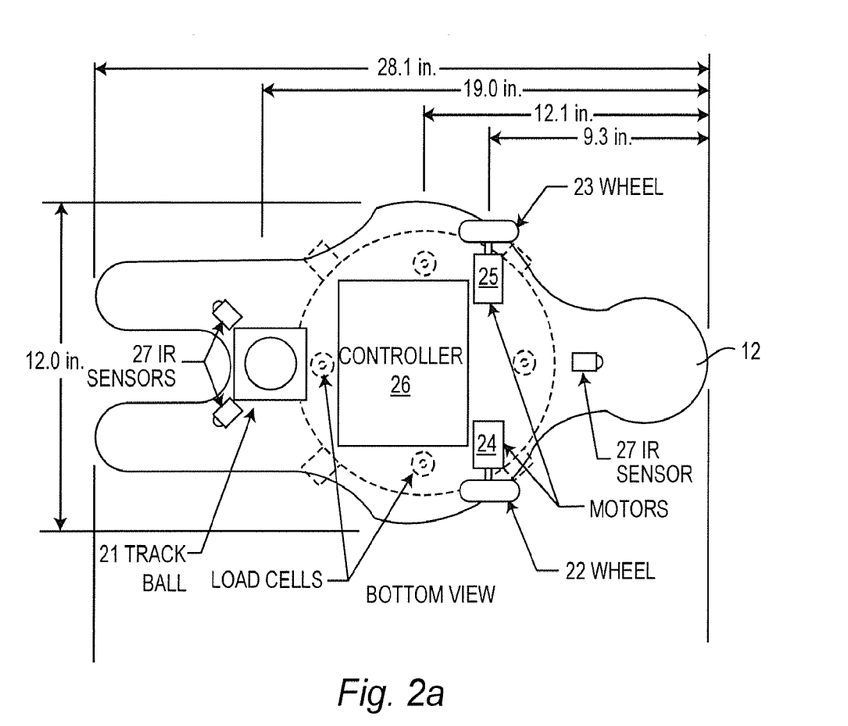
FIGS. 2a-b are bottom and side views of the self initiated prone progressive crawler showing the track ball and the DC torque motor driven wheels which constitute the three-point contact with the ground.
Figure 2B:
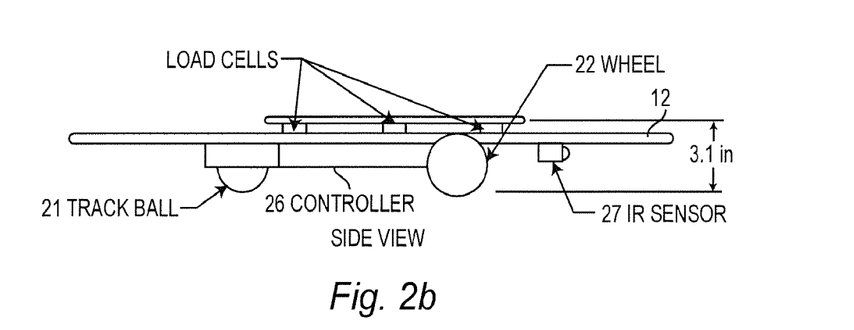
Figure 3A:
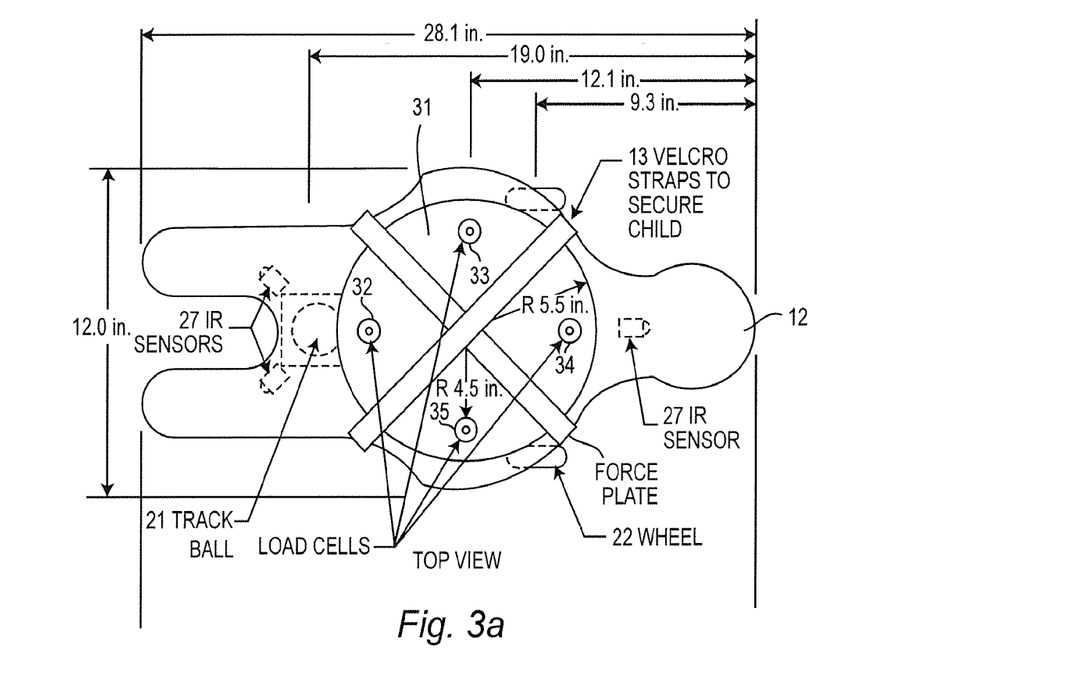
FIGS. 3a-b are top and side views of the self initiated prone progressive crawler showing the circular platform attached to the body of the self initiated prone progressive crawler via four equally spaced load cells.
Figure 3B:
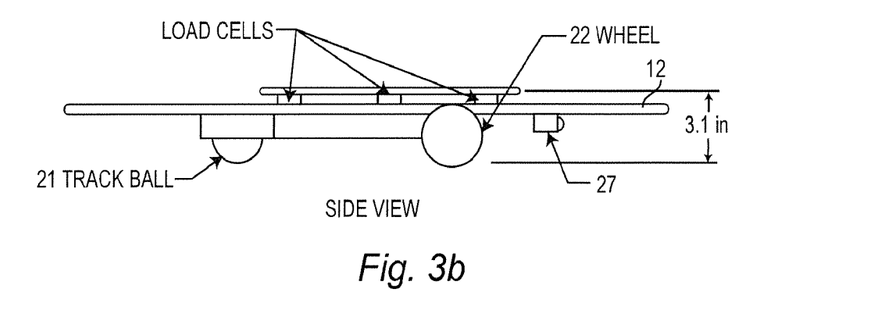
Figure 4:
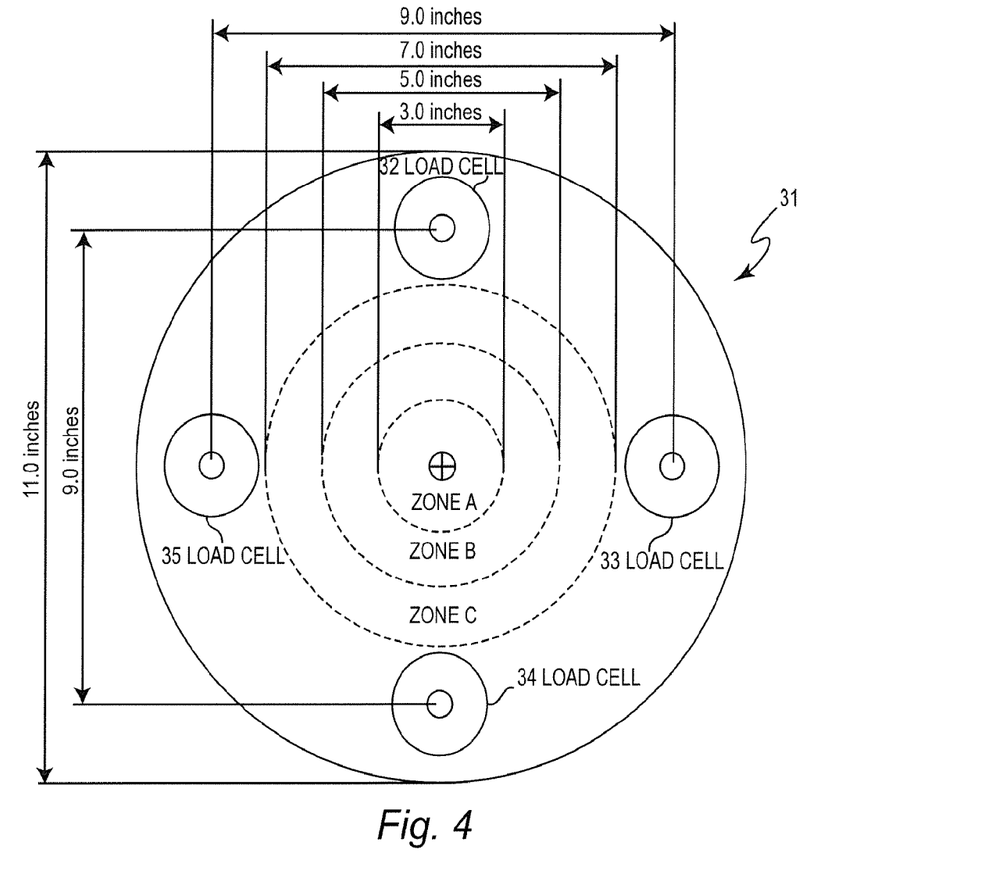
FIG. 4 is a schematic diagram of the force plate mounted to the top of the platform.
Figure 5:
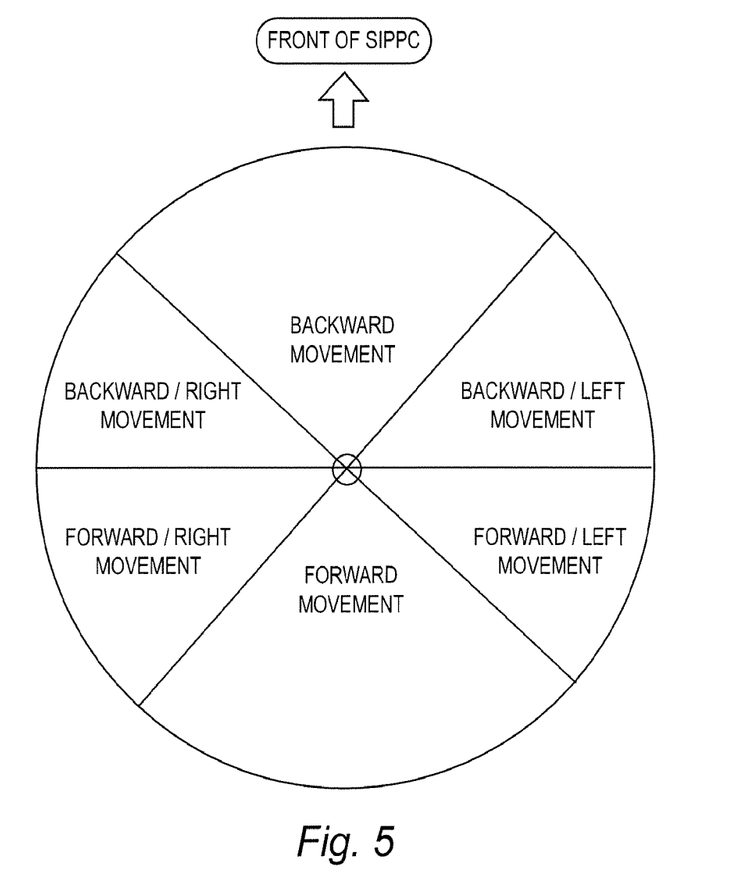
FIG. 5 is a diagram illustrating the force plate control zones.
Figure 6:
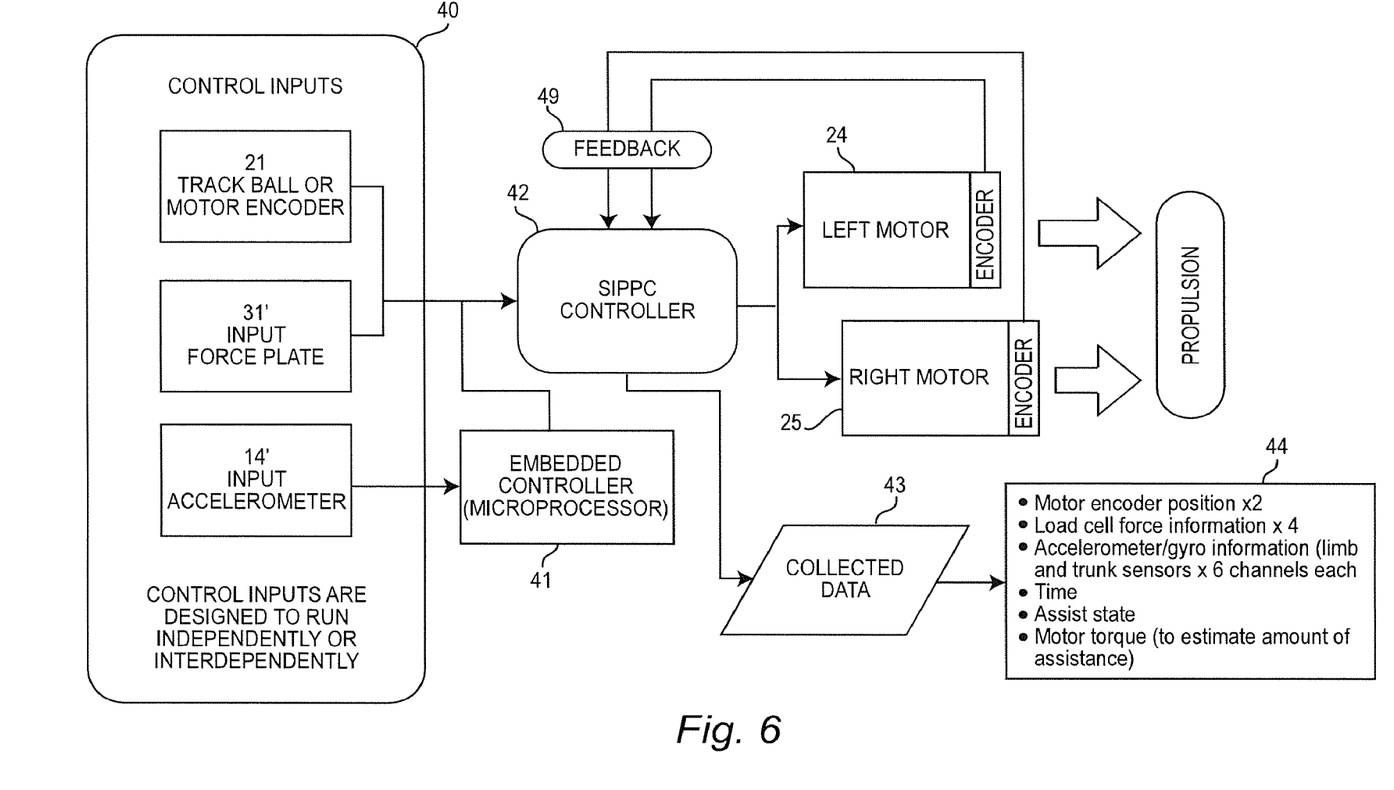
FIG. 6 is a schematic diagram showing the interrelationship of the functional components of the self initiated prone progressive crawler.

Referring now to the drawings, and more particularly to FIGS. 1a-b, 2a-b, and 3a-b, there is shown the self initiated prone progressive crawler 10 on which an infant 11 is secured in a prone position on the platform 12 of the device with the aid of hook and loop straps 13. As best shown in FIG. 2, the device has three points of contact with the ground. One point is an industrial trackball 21, mounted upside down to provide positional and positional derivative data to the controller. It is located roughly under the chest of the infant and is highly sensitive to movement. The other points of contact are two wheels 22 and 23 driven by respective DC torque motors 24 and 25. In one embodiment, the motors 24 and 25 are capable of producing 36 in-lbs of torque and can propel an infant weighing up to 35 lbs at a rate of three feet/min, yet are low friction when non-powered. The motors are linked to a multi-axis controller running custom software, as shown in FIG. 6 and described in more detail with reference to FIGS. 7 to 9. The electronics for the controller and data collection are located in a housing 26 between the DC torque motors. In addition, there are in the embodiment shown five infrared (IR) sensors 27 located at points around the periphery of the platform 12 of the device. These are for detecting obstacles. As best shown in FIG. 3a, the top of the self initiated prone progressive crawler is a force plate 31, shown in more detail in FIG. 4, in the form of a circular clear plastic platform attached to the platform 12 of the device via four equally spaced load cells 32, 33, 34, and 35 located under the infant's body. As shown in FIG. 4, the load cells support the force plate and, by their geometry, define zones that provide force information between the infant and the device to allow weight shifts to be assessed and used as a control parameter. FIG. 5 illustrates an example of how these zones are interpreted in terms of accessing the infant's intention. In addition, as shown in FIG. 1, tn-axial accelerometer gyros 14 may be attached to the upper and lower extremities of the child. The configuration of the device is designed to sense movement, determine the infant's intent, and engage the motors to facilitate that intent.

Figure 7:
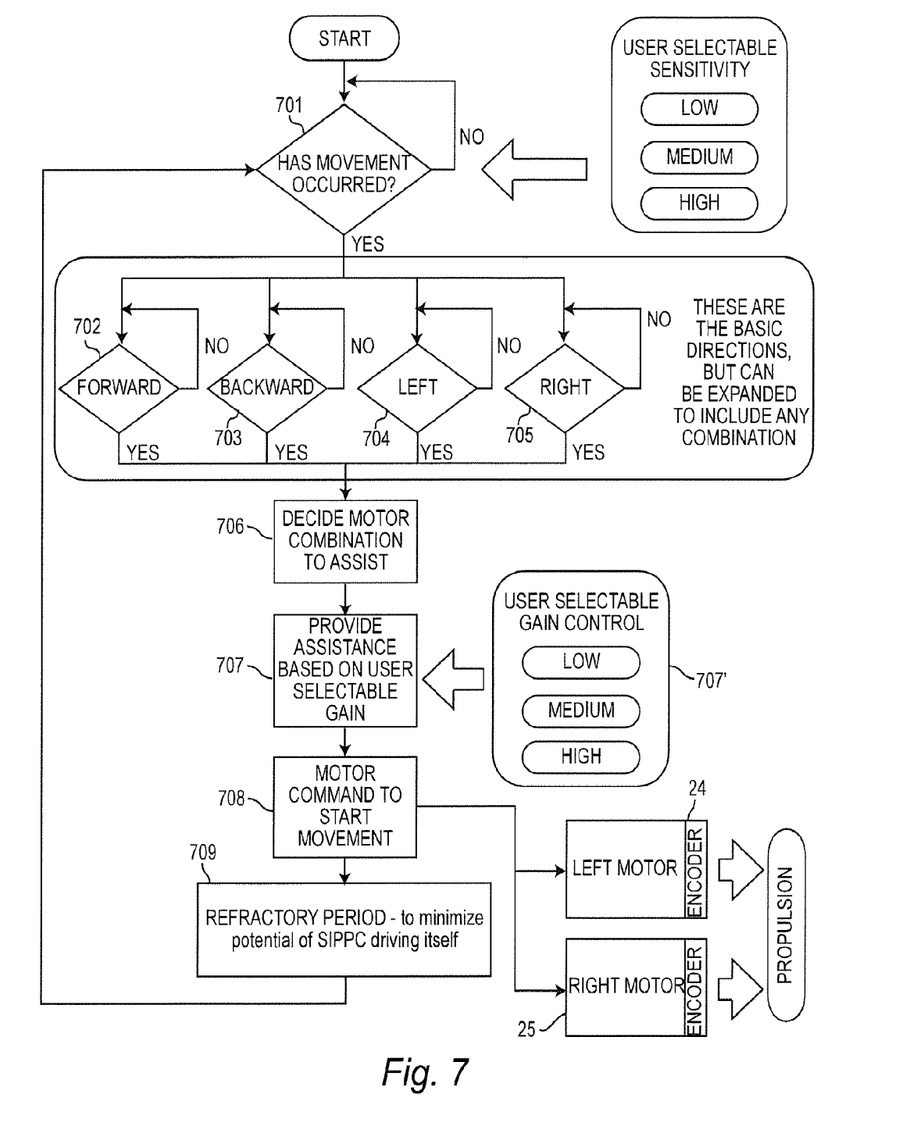
FIG. 7 is a flow diagram illustrating the logic of the software that implements the trackball algorithm.
Figure 8:
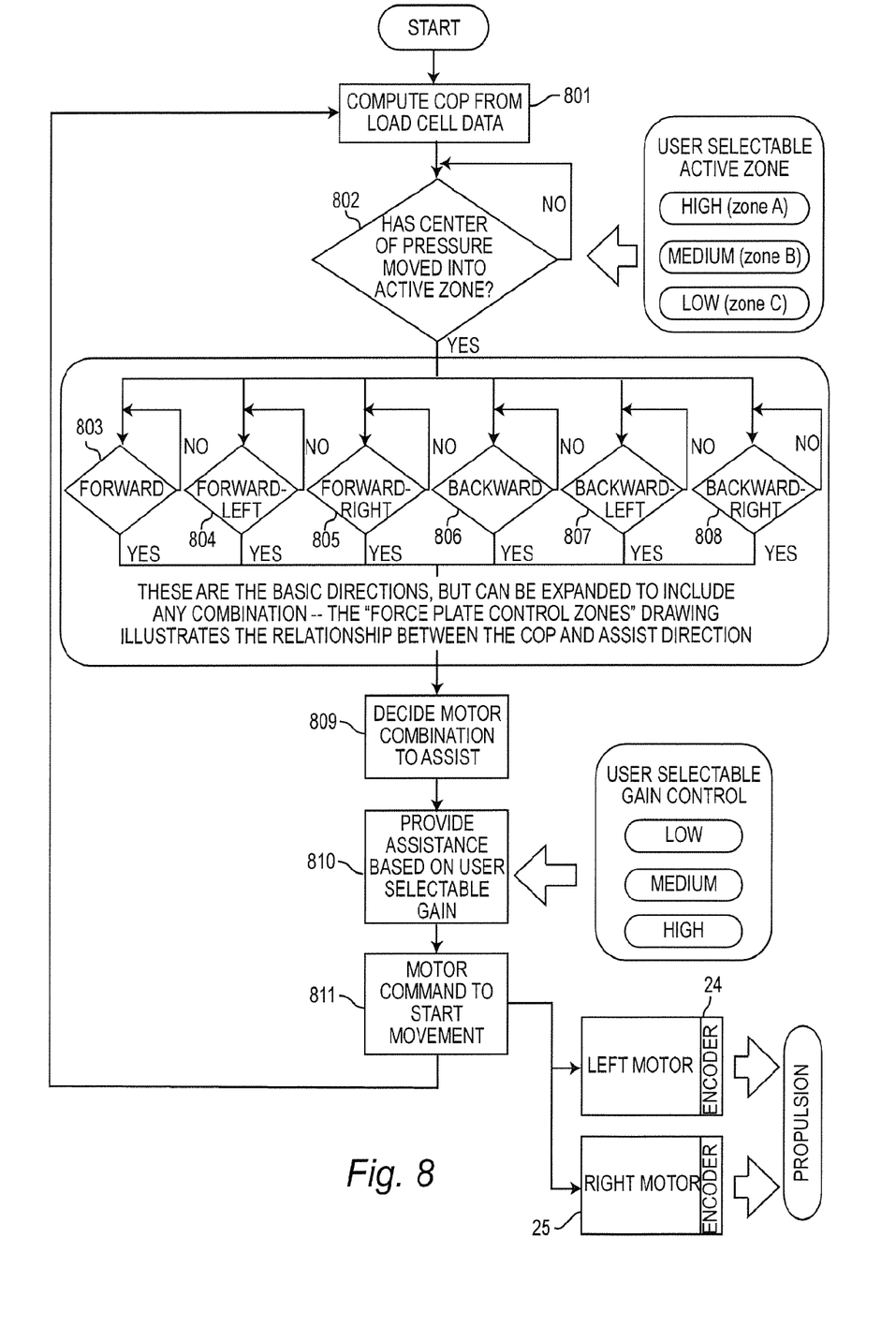
FIG. 8 is a flow diagram illustrating the logic of the software that implements the force plate algorithm.
Figure 9:
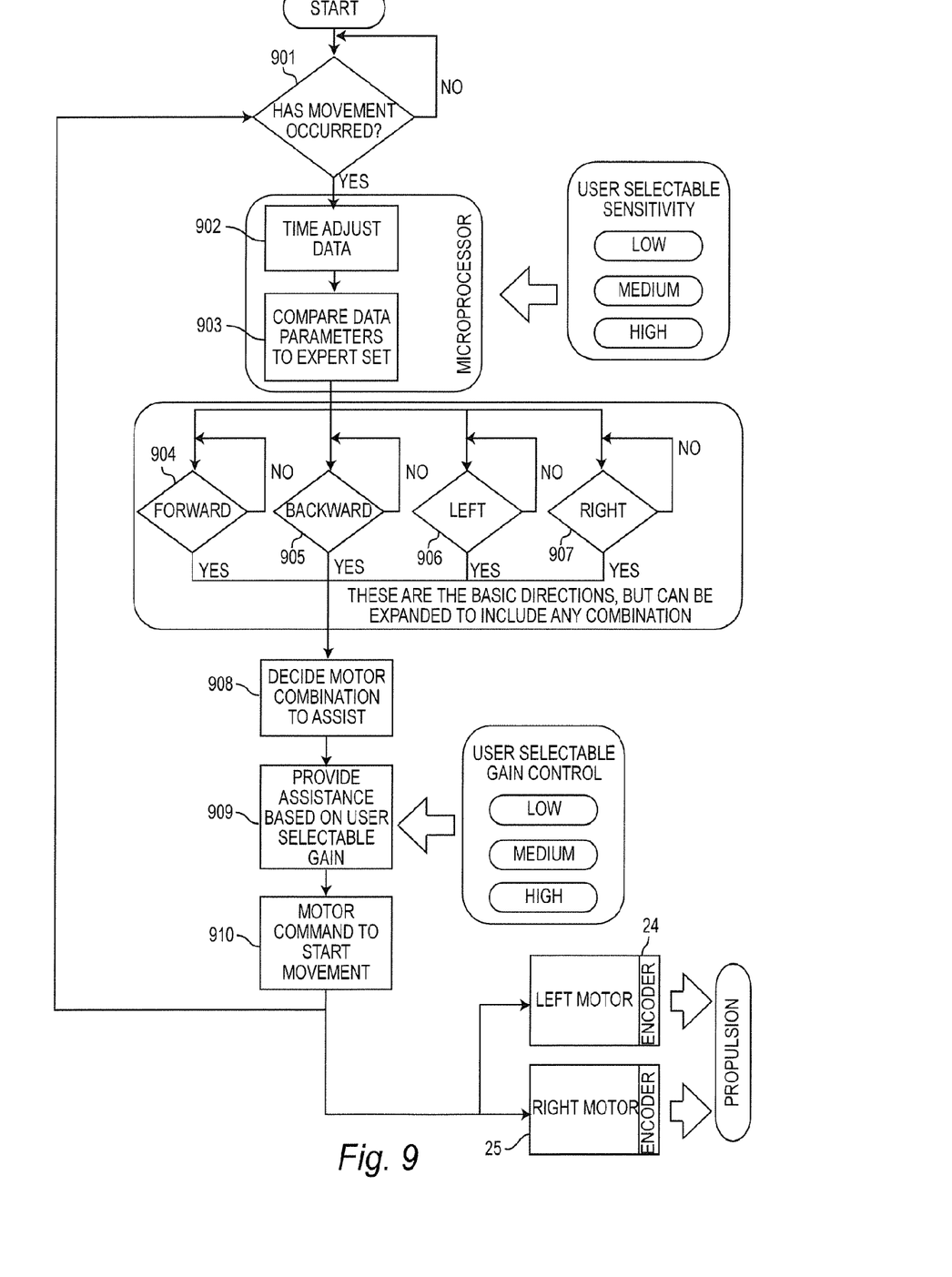
FIG. 9 is a flow diagram illustrating the logic of the software that implements the accelerometer algorithm.

FIG. 6 shows the relationship of the functional components of the self initiated prone progressive crawler. The control inputs 40 may include any or all of the trackball 21 (see trackball or motor encoder 21), the load cells 32, 33, 34, and 35 attached to the force plate 31 (see input for forceplate 31'), the tri-axial accelerometer gyros 14 (see input for gyros 14'), and the IR detectors 27. In some applications, other types of input might be employed (e.g., sonar or radar input may be employed). The outputs of the accelerometer gyros 14 are input to an embedded controller 41, which provides an input, together with the outputs of the trackball 21 and the load cells 32, 33, 34, and 35 to the self initiated prone progressive crawler (SIPPC) controller 42. Custom software, described in more detail with reference to FIGS. 7 to 9, provides control of the self initiated prone progressive crawler using a multi-axis controller 42 designed for robotics applications. Data collection may be accomplished by using a Microsoft Excel custom application 43 that allows data to be transferred and stored from a TCP/IP (Transmission Connection Protocol/Internet Protocol) connection. All self initiated prone progressive crawler data may be collected to a worksheet. Real-time graphs are displayed at 44 when the device is active. The SIPPC controller 42 controls a left DC torque motor 24 and a right DC torque motor 25. These are provided with analog-to-digital (A/D) encoders 47 and 48, respectively, which provide outputs to feedback loop 49.

The trackball algorithm implemented on the SIPPC controller 42 is illustrated in FIG. 7. The trackball 21 can be adjusted for sensitivity to movement. In the embodiment shown, the sensitivity levels are low, medium and high; however, fewer or greater number of sensitivity levels may be provided or, in the alternative, the sensitivity level may be pre-programmed. The first step in the software process is decision block 701 in which movement is detected. If movement is detected, the process goes to each of the decision blocks 702, 703, 704, and 705 to determine if the detected movement is forward, backward, left, right, or a combination of these. Depending on the results of the decisions made in decision blocks 702, 703, 704, and 705, a determination is made in function block 706 as to the motor combination required to assist the infant in directional movement. The output of function block 706 is provided to function block 707 where the amount of assistance to be provided is determined. In the embodiment shown, the gain control 707' for function block 707 can be adjusted for low, medium and high gain; however, fewer or greater number of gain levels can be provided or, rather than discrete levels of gain control, the gain control can be continuously variable. In another alternative, the gain control 707' can be pre-programmed. The output of function block 707 is used in function block 708 to generate control signals to the left and right DC torque motors 24 and 25. Function block 708 also provides input to function block 709 which provides feedback to decision block 701.

The forceplate algorithm implemented on the SIPPC controller 42 is illustrated in FIG. 8. The active zone (see FIG. 5) of the forceplate 31 can be adjusted in the embodiment shown. The active zones are low, medium and high; however, fewer or greater number of sensitivity zones may be provided or, in the alternative, the sensitivity level may be pre-programmed. The first step in the software process is function block 801 where the center-of-pressure (COP) is computed from the load cell data. Then in decision block 802 a decision is made as to whether the center of pressure has moved to an active zone. If so, the process goes to each of the decision blocks 803, 804, 805, 806, 807, and 808 to determine if the detected center of pressure is forward, forward left, forward right, backward, backward left, backward right, or a combination of these. Depending on the results of the decisions made in decision blocks 803, 804, 805, 806, 807, and 808, a determination is made in function block 809 as to the motor combination required to assist the infant in directional movement. The output of function block 809 is provided to function block 810 where the amount of assistance to be provided is determined. In the embodiment shown, the gain control for function block 810 can be adjusted for low, medium and high gain; however, fewer or greater number of gain levels can be provided or, rather than discrete levels of gain control, the gain control can be continuously variable. In the alternative, the gain control can be pre-programmed. The output of function block 810 is used in function block 811 to generate control signals to the left and right DC torque motors 24 and 25. Function block 811 also provides feedback to function block 801.

The accelerometer algorithm implemented on the SIPPC controller 42 is illustrated in FIG. 9. The first step in the software process is decision block 901 in which movement is detected. If so, the detected movement is output to the embedded controller 41 in which time adjust data is accessed in function block 902, and this data is compared to data parameters in an expert set in function block 903. In the embodiment shown, the sensitivity levels of the embedded controller can be adjusted as low, medium and high; however, fewer or greater number of sensitivity levels may be provided or, in the alternative, the sensitivity level may be pre-programmed. The process next goes to each of the decision blocks 904, 905, 906, and 907 to determine if the detected movement is forward, backward, left, right, or a combination of these. Depending on the results of the decisions made in decision blocks 904, 905, 906, and 907, a determination is made in function block 908 as to the motor combination required to assist the infant in directional movement. The output of function block 908 is provided to function block 909 where the amount of assistance to be provided is determined. In the embodiment shown, the gain control for function block 909 can be adjusted for low, medium and high gain; however, fewer or greater number of gain levels can be provided or, rather than discrete levels of gain control, the gain control can be continuously variable. In the alternative, the gain control can be pre-programmed. The output of function block 909 is used in function block 910 to generate control signals to the left and right DC torque motors 24 and 25. Function block 910 also provides feedback to decision block 901.

The software illustrated in the flow diagrams of FIGS. 7 to 9 has been developed with infant safety in mind while providing the experimenter with the flexibility to modify control parameters to positively influence the interaction between the infant and the self initiated prone progressive crawler. The software supports four modes of operation: passive mode, active trackball or movement mode, active forceplate mode, and accelerometer mode. All modes produce a level of assistance (or resistance) that can be part of an adaptive algorithm that decides how much to provide. The software which implements these modes is shown in flow diagram form in FIG. 10.

Figure 10:
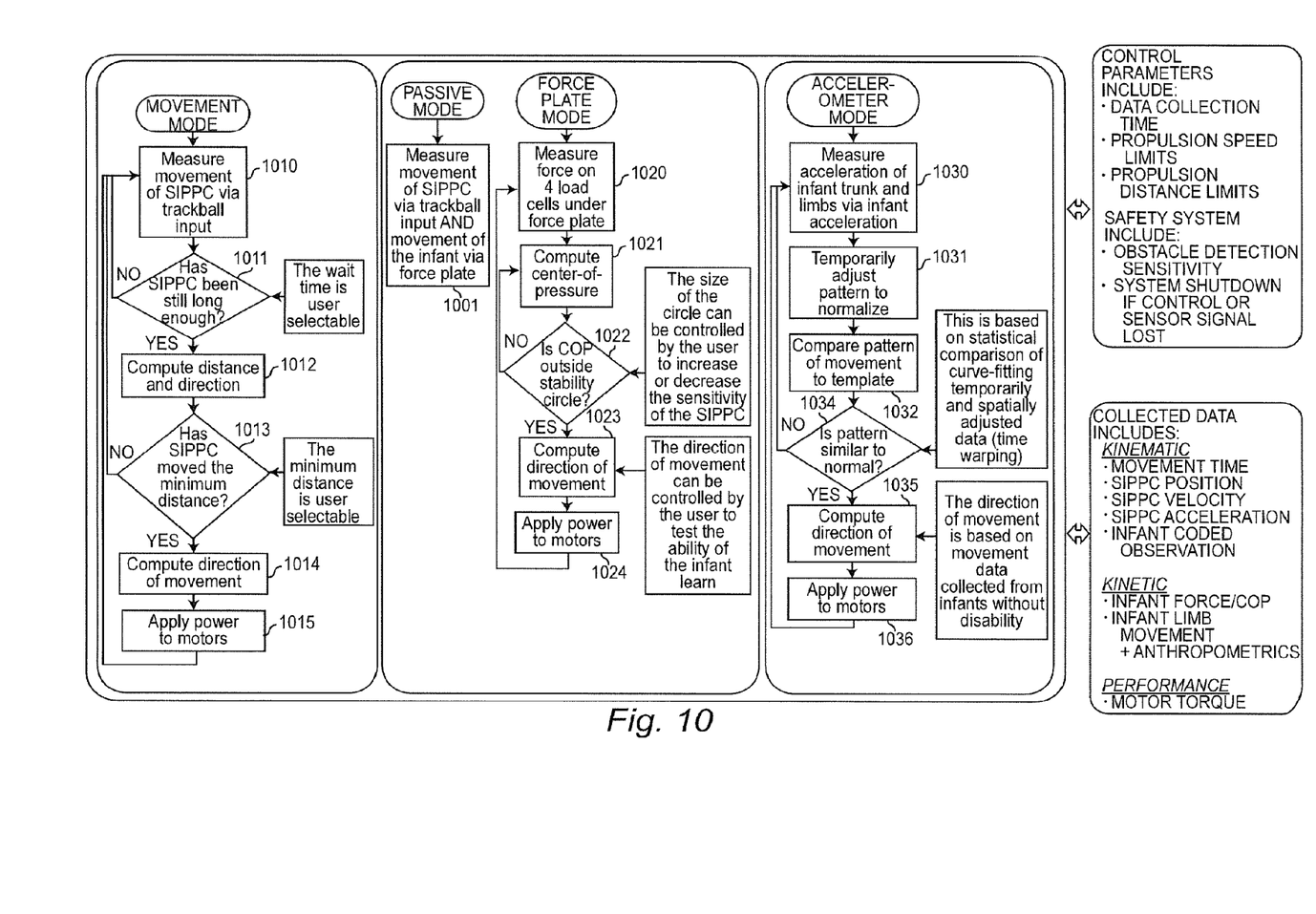
FIG. 10 is a flow diagram illustrating the logic of the several modes of operation of the self initiated prone progressive crawler according to the invention.

In the passive mode, the DC torque motors 24 and 25 are non-active and the device collects movement data from the trackball 21 and motor encoders 47 and 48 at function block 1001. Force data from the load cells on forceplate 31 is also collected and the center-of-pressure (COP) of the infant is computed and plotted. Accelerometer/gyro data will also be plotted when available.

In the active trackball or movement mode, the DC torque motors 24 and 25 are active and the device responds to input from the trackball 21. The infant must initiate movement with significant amplitude to be registered on the trackball sensor. The SIPPC controller 42 commands the motors to propel the self initiated prone progressive crawler in the direction of the disturbance. The distance and rate of movement are limited and the infant must re-engage the device to continue to get the assist. The process begins in function block 810 where a movement measurement of the self initiated prone progressive crawler is made via the trackball input. A determination is made in decision block 1011 as to whether the self initiated prone progressive crawler has been still long enough. The wait time is selectable by the user. If the wait time is determined to be long enough, the distance and direction are computed in function block 1012; otherwise, the process returns to function block 1010. Next, a determination is made in decision block 1013 as whether the self initiated prone progressive crawler has moved the minimum distance. Again, the minimum distance is selectable by the user. If the movement is the minimum distance, the direction of movement is computed in function block 1014; otherwise, the process returns to function block 1010. Then in function block 1015, power is applied to the DC torque motors 24 and 25 before the process returns to function block 1010.

In the active forceplate mode, the DC torque motors 24 and 25 are active and the device responds to changes in the COP recorded between the infant and the device via the forceplate 31. This mode of operation is equivalent to a "body self initiated prone progressive crawler control algorithm mouse". When the infant is centered on the device, their COP is typically near the center of the force plate 31. During crawling attempts or extremity movement, the COP will move in proportion to the redistribution of body mass. This occurs in a predictable pattern. Changes in the COP result in motor activation to propel the self initiated prone progressive crawler in the direction of intended movement. Movement assistance is again limited to encourage the infant to stay actively involved in the locomotion process. Sensitivity is controlled by creating a virtual no-assistance zone in the center of the forceplate. The motors will not activate if the COP is within this zone; the smaller the zone, the more sensitive the device to COP movements. The process begins at function block 1020 where the force on the four load cells 32, 33, 34, and 35 under the forceplate 31 is measured. Based on this measurement, the COP is computed in function block 1021. A determination is made in decision block 1022 as to whether the COP is outside the stability circle. The size of the circle can be controlled by the user to increase or increase the sensitivity of the self initiated prone progressive crawler. If the COP is outside the sensitivity circle, the direction of movement is computed in function block 1023; otherwise, the process returns to function block 1021. The direction of movement can be controlled by the user to test the ability of the infant to learn. Based on the computed direction of movement, power is applied to the DC torque motors 24 and 25 in function block 824 before the process returns to function block 1020.

In the active accelerometer mode, the DC torque motors 24 and 25 are again active and the device responds to movement data acquired from the limbs and trunk of the infant. This is accomplished by using tn-axial accelerometer gyros 14 attached to the upper and lower extremities of the child. This type of movement data provides patterns that can correlated to crawling allowing movement of the self initiated prone progressive crawler with "virtual" crawling. The infant does not need to touch the floor or physically move the self initiated prone progressive crawler, the infant only needs to move his or her limbs in space. Because of the variation in data between and within crawling movements, the kinematics would be adjusted to recognize patterns associated with intended crawling activity. Force plate and track ball data may be used to refine this decision algorithm. The process begins in function block 1030 where acceleration of the infant trunk and limbs is measured via the tri-axial accelerometer gyros 14. Next, a temporary adjustment to the pattern is made to normalize the measurement in function block 1031. The pattern of movement is compared to a template in function block 1032. A decision is then made as to the pattern is similar to normal. This determination is based on a statistical comparison of curve-fitting temporally and spatially adjusted data (i.e., time warping). If the pattern is similar to normal, the direction of movement is computed in function block 1035; otherwise, the process returns to function block 1030. Finally, power is applied to the DC torque motors 24 and 25 in function block 1036 before the process returns to function block 2030.

Figure 11:
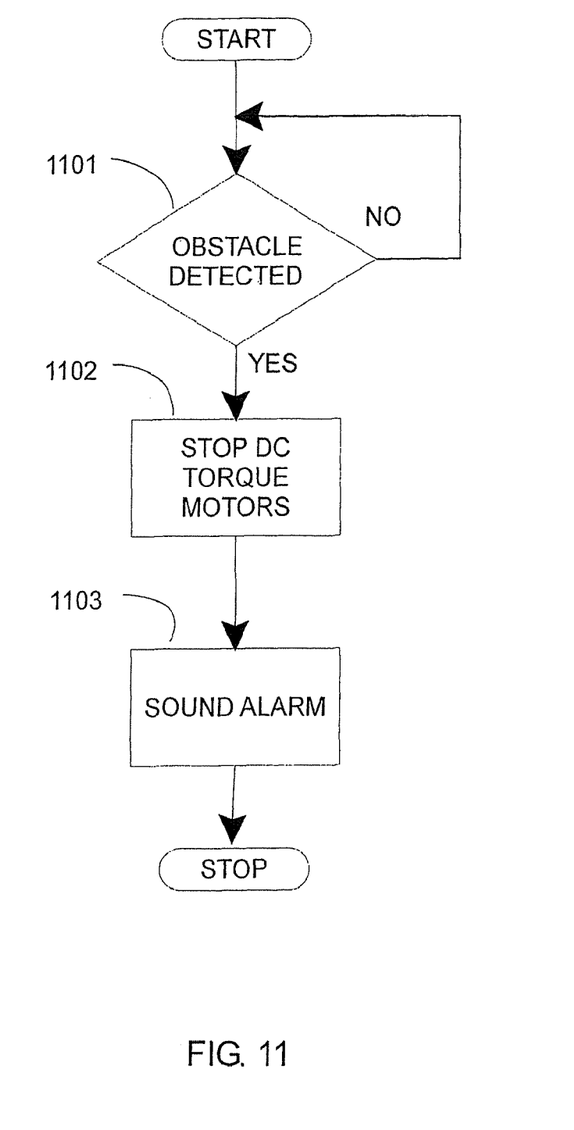
FIG. 11 is a flow diagram illustrating the logic of the software that implements obstacle detection and avoidance of the invention.

In each of these modes of operation, the control parameters include data collection time, propulsion speed limits, and propulsion distance limits. The safety system includes obstacle detection and system shutdown if control or sensor signal is lost. Referring first to FIG. 11, there is shown the flow diagram illustrating the logic of the software that implements obstacle detection. The inputs for obstacle detection are the IR sensors 27, shown in FIG. 2. The process starts in decision block 1101 where a determination is made as to whether an obstacle has been detected. The obstacle could be a wall, stairs, furniture, etc. The nature of the obstacle is not important. In one embodiment, the self initiated prone progressive crawler device may be stopped before the infant encounters the obstacle. If an obstacle is detected, the controller 42 stops the DC torque motors 24 and 25 in function block 1102. Then in function block 1103, an alarm may be sounded to notify the user that the infant is about to encounter an obstacle. In addition to an audible alarm, a light may be placed on the platform and made to flash in function block 1103.

Figure 12:
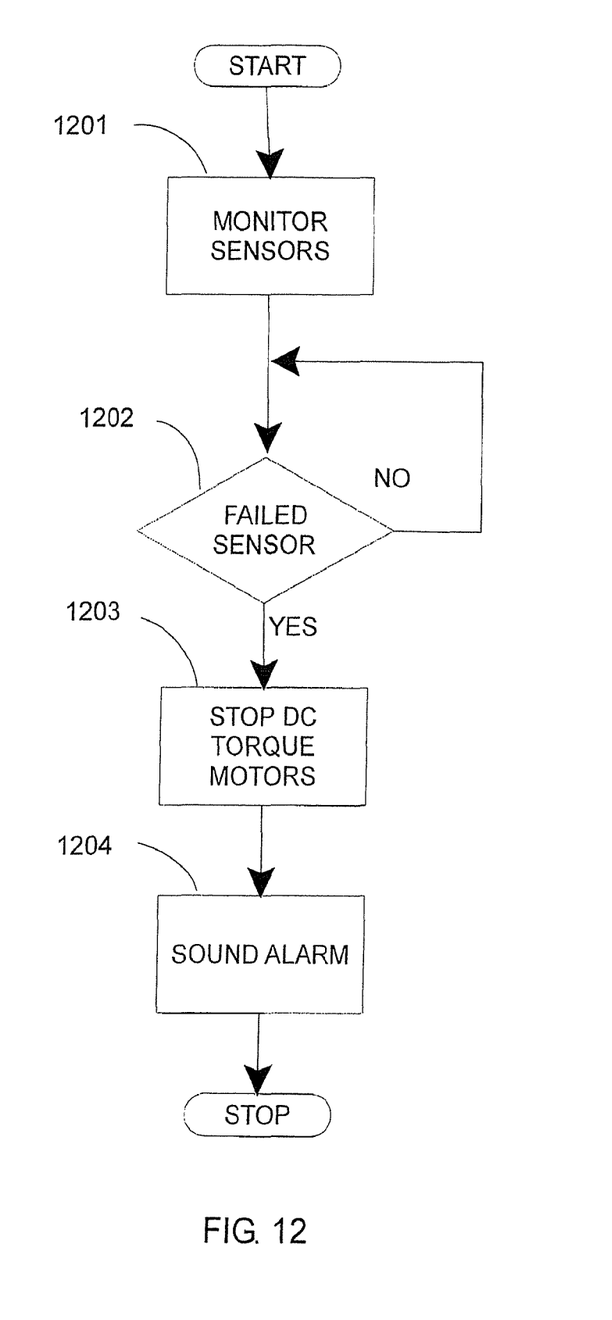
FIG. 12 is a flow diagram illustrating the logic of the software that implements the system shutdown operation of the invention.

An example of the system shutdown is shown in FIG. 12, which shows the flow diagram illustrating the logic of the software that implements this feature. The process begins in function block 1201 where the controller 42 monitors the several sensors; i.e., the trackball 21, the force plate 31, the accelerometer gyros 14, and the IR sensors 27. A determination may be made in decision block 1202 as to whether a sensor has failed. If so, the controller 42 can stop the DC torque motors 24 and 25 in function block 1203. Then in function block 1204, an alarm may be sounded to notify the user that a sensor has failed. As in the obstacle detection software, in addition to an audible alarm, a light may be placed on the platform 12 and made to flash in function block 1204. In each of the these two processes, the audible and/or flashing light signal may be different in terms of frequency or pattern to provide an indication to the user as to the nature of the fault. Once the fault has been corrected, e.g., the obstacle removed or sensor replaced, the system may require resetting prior to continued use.

The collected data includes kinematic data, kinetic data and performance data. the kinematic data includes movement time, self initiated prone progressive crawler position, self initiated prone progressive crawler velocity, self initiated prone progressive crawler acceleration, and infant coded observation. The kinetic data includes infant force (i.e., the COP) and infant limb movement (i.e., the tri-axial accelerometer gyros) plus anthropometrics. The performance data collected is the DC motor torque.

Safety has been addressed on several levels.

1. The device design provides no sharp edges or exposed electromechanical components. The top surface is padded and head support is provided. It is low to the ground, promoting extremity contact and, facilitating a quadruped position for locomotion.
2. The motors and controller are designed to limit propulsion speeds via both software and hardware limit switches. This provides two layers of protection; one that is hardwired and one that is based on software decisions.
3. Propulsion distance is also limited following an activation event. The device is not designed to provide continuous facilitation. When assistance is triggered, the motors engage for a brief period to facilitate movement in the triggered direction. This parameter is under experimenter control, but is limited to a maximum of 500 ms. The default is 300 ms on system start-up.
4. All control logic circuits employ a failsafe design such that if the signal between any components in the system were lost, the system disables itself.
5. Infrared proximity detectors are mounted on the device to eliminate contact between the self initiated prone progressive crawler and vertical surfaces, and to prevent accidental stairs descent. Again, these circuits are designed such that if the signal from these detectors is lost, the system disables itself.
6. The final intrinsic safety feature is supervision. It is required that use of the self initiated prone progressive crawler will be under supervised conditions at all times.

A novel feature of the invention is the packaging. The controller, motors, and input transducers are all housed on the self initiated prone progressive crawler in a configuration that has a profile low enough for the infant to reach the floor. The only connection between the device and the "outside world" may be a CAT5 (Category 5) computer cable and a power cable. Wireless control may also be employed.

The modes of control are also novel and allow a progression of infant motor-development plans to be implemented. It was designed with research flexibility in mind. It can easily be modified to include future control ideas and combinations of existing control ideas.

Figure 13:
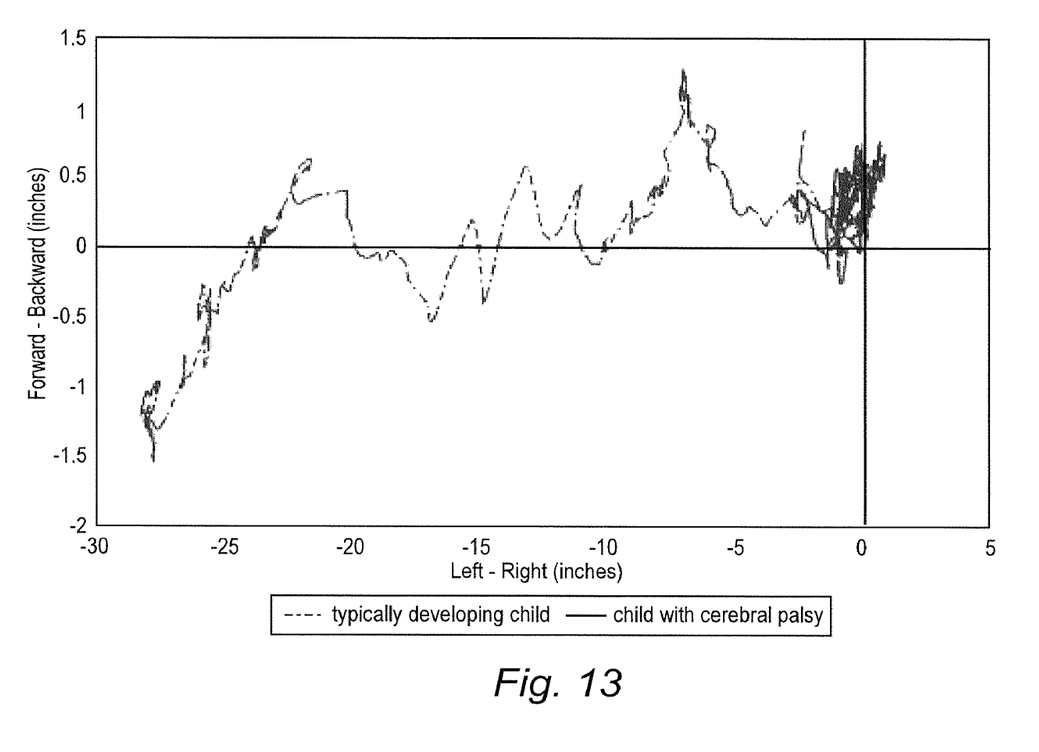
FIG. 13 is a chart of path data (total distance traveled) illustrating the small area traversed by a child with cerebral palsy compared to a typically developing child.

The device was designed with research in mind and has been tested on children with Cerebral Palsy (CP). Early data suggests that it does provide facilitated movement. Children with CP do not typically explore their environment like typically developing children. FIG. 13 illustrates a pattern of movement for two subjects. When the self initiated prone progressive crawler is in an active mode, the child with CP can move the device like a young infant with typical development.

The device also has utility, not just for children with disabilities, but also for the normally developing child. Facilitating early movement may have some intrinsic benefit to the development of motor coordination and promotes early exploration. The device is unique and innovative in that it does not only serve as an assist or intervention device, but can also be used to gather much needed comprehensive information about how infants with brain lesions learn new motor skills.

Electronic components continue to get smaller and lighter with each generation. The next step is to reduce the need for external power by supplying that power with on-board batteries. The data collection cable could also be replaced with a wireless interface.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A device which facilitates crawling in infants comprising:
    a platform on which an infant can be positioned prone with arms and legs in contact with a surface below the platform, on which surface said platform is moveable;
    one or more sensors for detecting arm and leg movements of the infant on the platform;
    a controller receiving outputs from the one or more sensors for assessing an intended direction of movements of the infant based on detected arm and leg movements; and
    a motive device controlled by the controller for moving the platform in the intended direction assessed by the controller to assist the infant in locomotion.

2. The device of claim 1, wherein the one or more sensors comprises:
    a force plate mounted on the platform on which the infant rests; and
    a sensor attached to the force plate for sensing center-of-pressure (COP) of the infant.

3. The device of claim 2, wherein the sensor for sensing COP comprises four load cells supporting the force plate on the platform.

4. The device of claim 1, wherein the one or more sensors comprises:
    a trackball mounted upside down under the platform at a position located roughly under the chest of the infant; and
    a sensor attached to the trackball to provide positional and positional derivative data.

5. The device of claim 4, wherein the motive device comprises:
    first and second wheels which together with the trackball comprise three points of contact with the ground; and
    first and second DC torque motors connected to drive respective ones of the first and second wheels, said first and second DC torque motors being responsive to the controller to move the platform in a direction that reflects an infant's intent.

6. The device of claim 1, wherein the one or more sensors comprises tri-axial accelerometer gyros which are adapted to be attached to the extremities of an infant.

7. The device of claim 1, wherein the one or more sensors comprises:
    a force plate mounted on the platform on which the infant rests;
    a first sensor attached to the force plate for sensing center-of-pressure (COP) of the infant;
    a trackball mounted upside down under the platform at a position located roughly under the chest of the infant; and
    a second sensor attached to the trackball to provide positional and positional derivative data.

8. The device of claim 7, wherein the first sensor for sensing COP comprises four load cells supporting the force plate on the platform.

9. The device of claim 7, wherein the motive device comprises:
    first and second wheels which together with the trackball comprise three points of contact with the ground; and
    first and second DC torque motors connected to drive respective ones of the first and second wheels, said first and second DC torque motors being responsive to the controller to move the platform in a direction that reflects an infant's intent.

10. The device of claim 1, wherein the one or more sensors comprises:
   a force plate mounted on the platform on which the infant rests;
   a first sensor attached to the force plate for sensing center-of-pressure (COP) of the infant;
   a trackball mounted upside down under the platform at a position located roughly under the chest of the infant;
   a second sensor attached to the trackball to provide positional and positional derivative data; and
   tri-axial accelerometer gyros which are adapted to be attached to the extremities of an infant.

11. The device of claim 1, wherein the controller is programmed to control the motive device to drive the platform a specified distance at a specified speed.

12. The device of claim 11, wherein the controller is programmed to vary one of the specified distance and specified speed.

13. The device of claim 11, wherein the controller is programmed to drive the platform a specified distance at a specified speed only when a center-of-pressure (COP) of the infant on the platform is outside a specified zone.

14. The device of claim 1, further comprising a sensor for sensing when the platform is near an obstruction and providing an input to the controller, said controller being programmed to stop motion of the platform in a vicinity of the obstruction.

15. The device of claim 1, wherein the controller is programmed to monitor the one or more sensors and, upon detection of a fault in the sensor means, to stop motion of the platform.

16. A method for facilitating crawling in infants which is implemented with a comprising a platform on which an infant can be positioned prone with arms and legs in contact with a surface below the platform, on which surface said platform is moveable, one or more sensors for detecting arm and leg movements of the infant on the platform, a controller receiving outputs from the one or more sensors, and a motive device for moving the platform, the method comprising the steps of:
   assessing by the controller based on the outputs from the one or more sensors intended movements made by the infant which correspond to detected arm and leg movements while the infant is on the platform;
   controlling by the controller the motive device to assist the infant in locomotion based on assessed intentions of the infant.

17. The method of claim 16, wherein the controller determines center of pressure (COP) of the infant on the platform, the COP determination being used by the controller to access intended movements of the infant.

18. The method of claim 16, wherein the one or more sensors includes a trackball mounted upside down under the platform at a position located roughly under the chest of the infant, said trackball including a sensor to provide positional and positional derivative data to the controller, the positional and positional derivative data being used by the controller to access intended movements of the infant.

19. The method of claim 16, wherein the one or more sensors include tri-axial accelerometer gyros which are adapted to be attached to the extremities of an infant, accelerometer data provided to the controller being used by the controller to access intended movements of the infant.

20. The method of claim 16, wherein the controller determines center of pressure (COP) of the infant on the platform, wherein the one or more sensors includes a trackball mounted upside down under the platform at a position located roughly under the chest of the infant, said trackball including a sensor to provide positional and positional derivative data to the controller, the COP determination and positional and positional derivative data being used by the controller to access intended movements of the infant.

21. The method of claim 16, wherein the controller determines center of pressure (COP) of the infant on the platform, wherein the one or more sensors includes a trackball mounted upside down under the platform at a position located roughly under the chest of the infant, said trackball including a sensor to provide positional and positional derivative data to the controller, and wherein the one or more sensors further includes tri-axial accelerometer gyros which are adapted to be attached to the extremities of an infant, the COP determination, positional and positional derivative data and accelerometer data from the tri-accelerometer gyros being used by the controller to access intended movements of the infant.

* * * * *